June 4, 1946.  G. W. WILLARD  2,401,382
QUARTZ CRYSTAL TESTING DEVICE AND METHOD
Filed May 8, 1943  5 Sheets-Sheet 3

INVENTOR
G.W. WILLARD
BY
E.V. Griggs
ATTORNEY

June 4, 1946.  G. W. WILLARD  2,401,382
QUARTZ CRYSTAL TESTING DEVICE AND METHOD
Filed May 8, 1943  5 Sheets-Sheet 4

INVENTOR
G. W. WILLARD
BY E. V. Griggs
ATTORNEY

June 4, 1946.   G. W. WILLARD   2,401,382
QUARTZ CRYSTAL TESTING DEVICE AND METHOD
Filed May 8, 1943   5 Sheets-Sheet 5
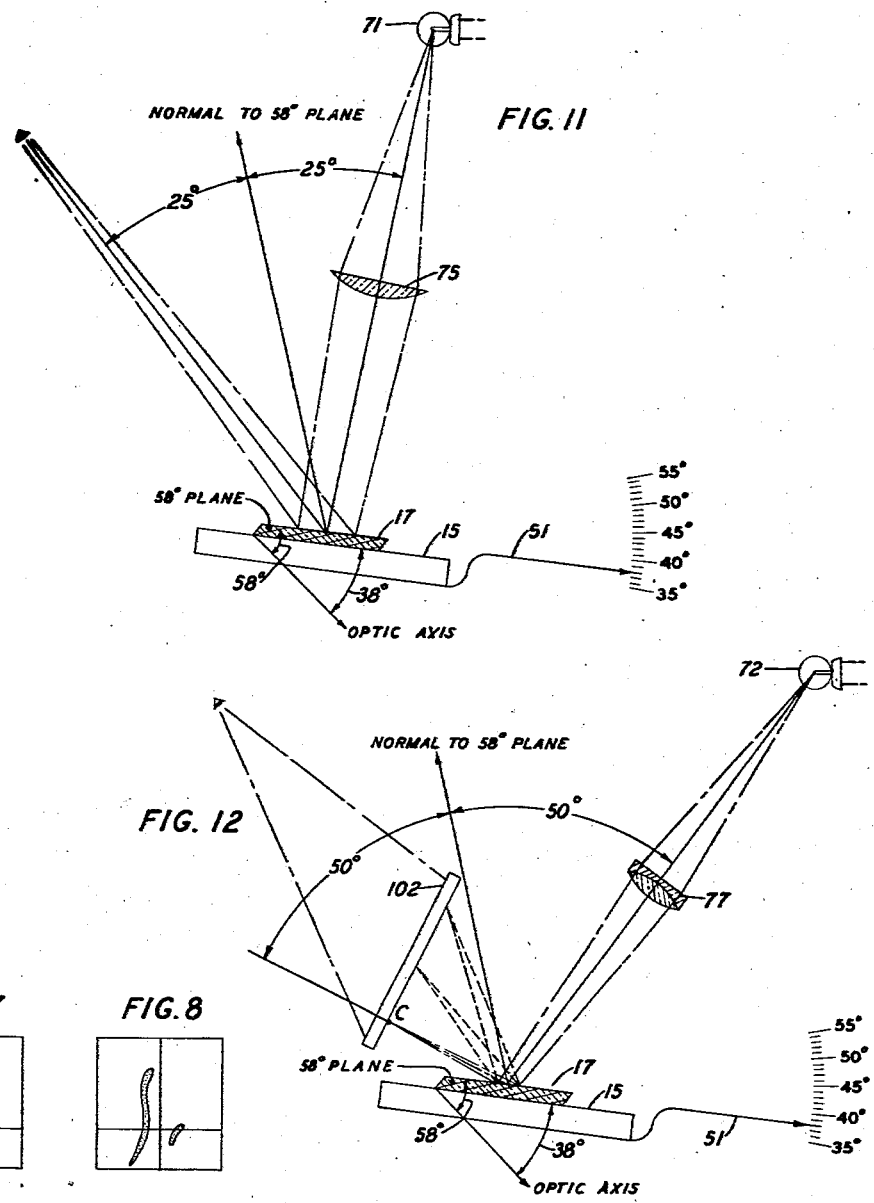
INVENTOR
G. W. WILLARD
BY E. V. Griggs
ATTORNEY Patented June 4, 1946

2,401,382

UNITED STATES PATENT OFFICE 2,401,382

QUARTZ CRYSTAL TESTING DEVICE AND METHOD

Gerald W. Willard, Fanwood, N. J., assignor to Bell Telephone Laboratories, Incorporated, New York, N. Y., a corporation of New York Application May 8, 1943, Serial No. 486,131

16 Claims. (Cl. 88—14)

This invention relates to an optical device and particularly to an optical device for the examination and classification of slabs of crystalline material such as quartz.

An object of the invention is to facilitate the production of quartz piezoelectric plates.

A more specific object of the invention is to indicate the presence, or absence, of electrical twinning in quartz slabs as well as the electrical twinning boundaries in the event such twinning is present.

Another specific object of the invention is to indicate the sense of orientation (+Φ or —Φ) of each portion of the slab separated by the twinning boundary, or of the entire slab if no twinning exists.

Still another specific object of the invention is to indicate the presence, or absence of optical twinning in quartz slabs as well as the optical twinning boundaries in the event such twinning is present.

Raw quartz, from which quartz piezoelectric plates of the type now being used in increasing numbers in radio and other electrical circuits are produced, commonly contains electrical twinning, i. e., a crystal of given handedness, right or left, contains regions of opposite electrical sense (the crystal axes of both portions are still parallel each to each respectively). The raw quartz also commonly contains optical twinning, i. e., regions of opposite handedness with crystal axes of both regions still parallel to each other. Other types of twinning, while occasionally encountered, are rare.

In order to obtain certain advantages, it has previously been proposed to produce quartz piezoelectric plates by cutting the blank at various orientations with respect to the axes of the natural crystal. For example, one such plate is produced, as described in detail in Patent 2,268,365, issued to me December 30, 1941, by cutting the plate from the natural crystal so orientated that the major surfaces thereof are inclined +38 degrees with respect to the Z, or optic, axis and are parallel to an X, or electric, axis. In production of such plates, the raw crystal is commonly sectioned perpendicularly to the Z-axis and the resulting sections, known as Z-cut sections, after certain examinations, markings, etc. are sawed into +38 degree slabs which slabs are finally diced up into plates.

If electrical twinning be present in the section, a certain portion will have opposite electrical sense to that of another portion, and if a number of slabs be cut from the section all at +38 degrees with respect to one portion, a certain portion of some of the slabs will be "good," i. e., +38 degrees, while another portion of the same slabs will be "bad," i. e., —38 degrees. However, if slabs had been sawed from each portion at +38 degrees with respect to the portion in which they lie, i. e., at 76 degrees with respect to each other, all slabs would have been good, i. e., +38 degrees.

In most cases where electrical twinning is present a section will be divided by a single electrical twinning boundary into two opposite electrical twins. In cases where there is more than a single electrical twinning boundary and the section is divided into three or more electrical twins, each twin will be of opposite electrical sense to that of the adjacent twin. In many cases the electrical twins are each sufficiently large to permit each to be used independently, after they have been separated by sawing along a twinning boundary or as close to the boundary as commercially feasible; mainly "good," 38 degree plates are thereby produced.

If optical twinning be present in the section a certain portion of the section will be of opposite handedness to that of another portion and may have the same or opposite electrical sense. (Optical twinning is here taken to mean twinning that shows up "optically," i. e., it may be detected, if present, by viewing the specimen, illuminated by polarized light, through a suitable analyzer.) If slabs be cut, all at +38 degrees, from a section in which optical twinning is present and having the same electrical sense, the result will be as above, i. e., portions will be good, +38 degrees, while other portions will be bad, —38 degrees. If the section had opposite electrical sense and all slabs were cut at +38 degrees, portions of opposite electrical sense would result. (Plates of reduced electrical activity or even entirely inactive plates would be the result.) As a rule a section in which optical twinning is present will be largely of one handedness with from a single to a considerable number of small angular regions of the opposite handedness either isolated or closely interlayered. The section is not, as a rule, divisible into two or more usable regions and the twinned portion usually must be cut away and discarded.

It will be apparent from the above that it is desirable to be able to determine, before starting to dice up a slab into plates, whether the slab contains electrical twinning and, if so, first the boundary of twinning and, second, the sense of each portion, i. e., in the case above, +38 degrees or —38 degrees; if no twinning is present it is desirable to determine whether the sense of cut of the whole slab is +38 degrees or −38 degrees. Further, it is desirable also to determine whether the slab contains optical twinning and, if so, the boundary of isolated twins and the enclosing, outer boundary of closely interlayered twins. In general, such regions are all unusable but if any such regions should be found to be large enough to be usable the orientation sense thereof may then be determined.

The arrangement contemplated by the present invention provides for readily ascertaining whether electrical twinning is present in a slab and, if so, shows the twinning boundary and, further provides indication, in the event of twinning, of "good" portions and "bad" portions, and if no twinning exists of "good" and "bad" slabs.

A feature of the invention resides in the provision of a single unitary device capable of performing separate tests on a piezoelectric slab for determining, first, whether twinning is present and, if so, the boundary thereof and, second, the orientation sense of each usably large twinned portion.

A further feature of the present invention is a movable viewing screen used for one test but not used for the other and means controlled by the position of the screen for selectively energizing either one of two light sources depending upon which test is to be performed.

In accordance with a specific embodiment of the invention, a box-like device is provided within which are located an adjustable platform for supporting the slab to be examined, a first light source, a lens system for projecting light therefrom upon the slab during one test, a second light source, a second lens system for projecting light from this second source upon the slab during the second test and a viewing screen which, as it is used during one test but not during the other, is tiltable between a forward position and a rearward position. The light sources are selectively energized in accordance with the position of the viewing screen. An eyepiece is provided in one wall of the box through which the observer may view the slab positioned on the platform; the viewing screen when in the forward position is in the range of vision of the observer and, when in the rearward position, is out of his range of vision. Suitable openings are provided in the box into which the observer may insert his hands for manipulating the slabs being tested and for movement of the viewing screen from one position to the other. Suitable containers for unexamined and examined slabs may also be inserted and removed through these openings.

A complete understanding of the arrangement contemplated by the invention and appreciation of the various advantageous features thereof may be gained from consideration of the following detailed description and the accompanying drawings in which:

Figs. 7, 8, 9 and 10 show the various types of "figures" observed during the test procedure illustrated by Fig. 6;

Fig. 11 illustrates schematically the angular arrangements of illumination and viewing utilized in the test procedure of Fig. 4;

Fig. 12 illustrates schematically the angular arrangement utilized in the test procedure of Fig. 6;

Fig. 15 is a side elevational view of an auxiliary specimen supporting table used for supporting finished quartz plates;

Fig. 16 is a plan view of the table of Fig. 15; and

Fig. 17 is a side elevational view in partial section, of the auxiliary table showing a plate mounted thereon to which lead-in and mounting wires have been attached.

Figure 1:
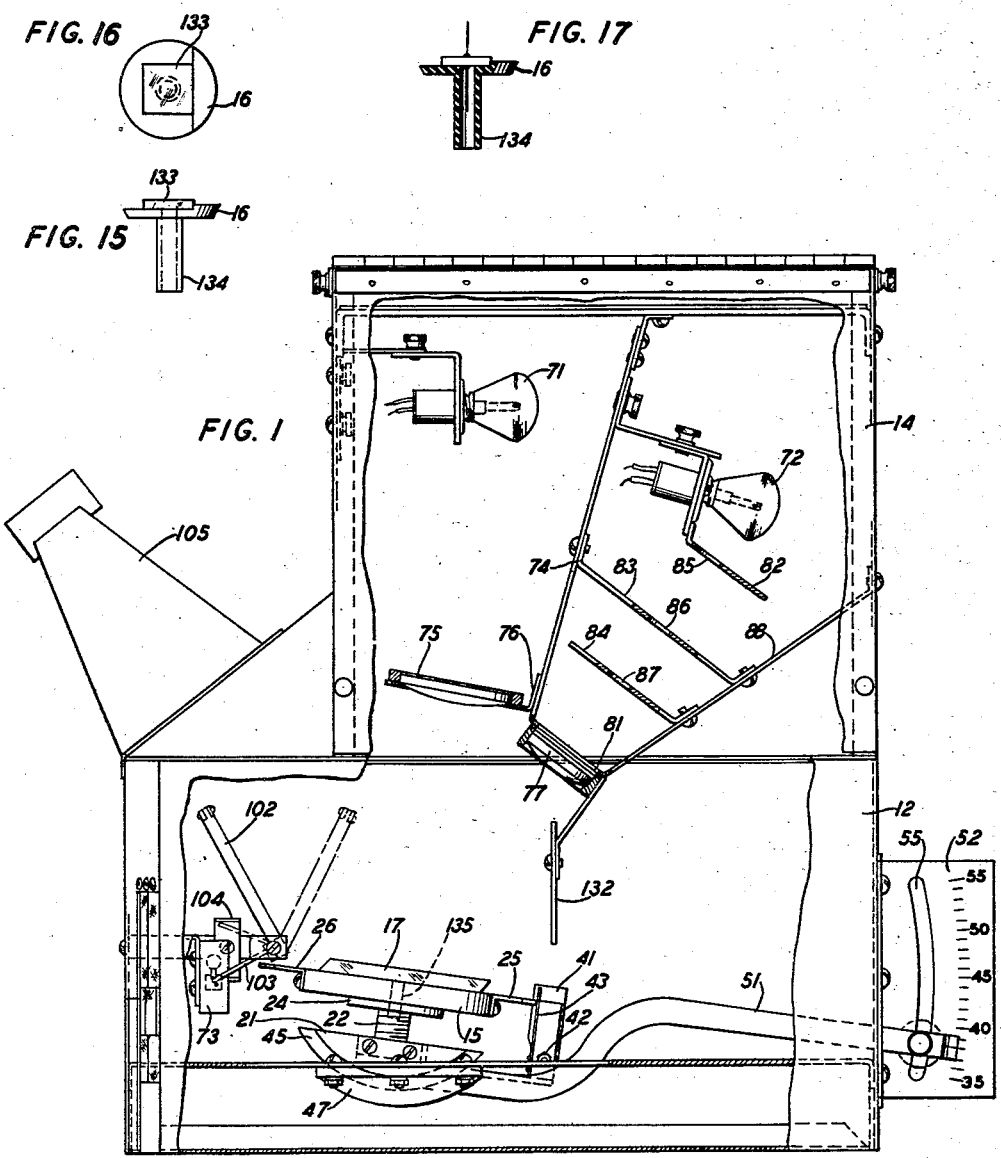
Fig. 1 is a side elevational view of an optical testing device which embodies features of the present invention; a side wall being broken away to show the interior of the device.
Figure 2:
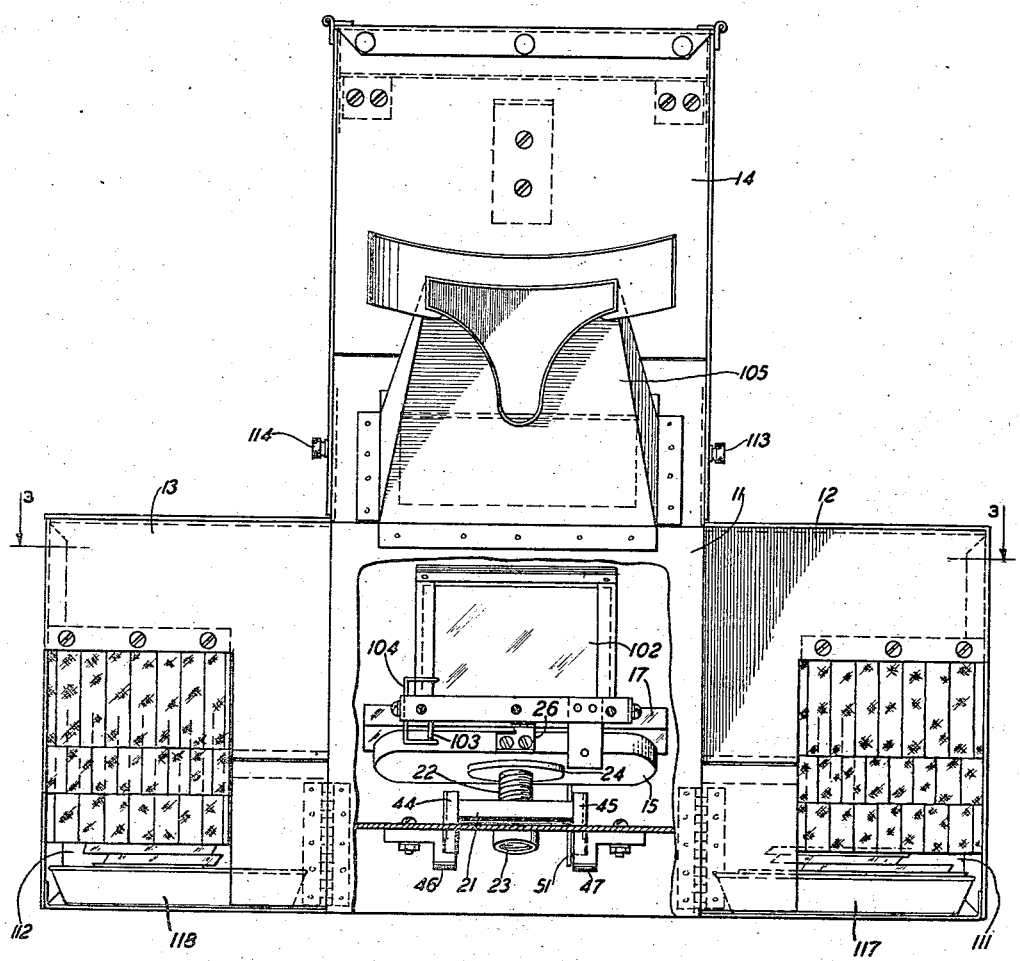
Fig. 2 is a front view of the device of Fig. 1, a portion of the central front wall being broken away to show interior details.
Figure 3:
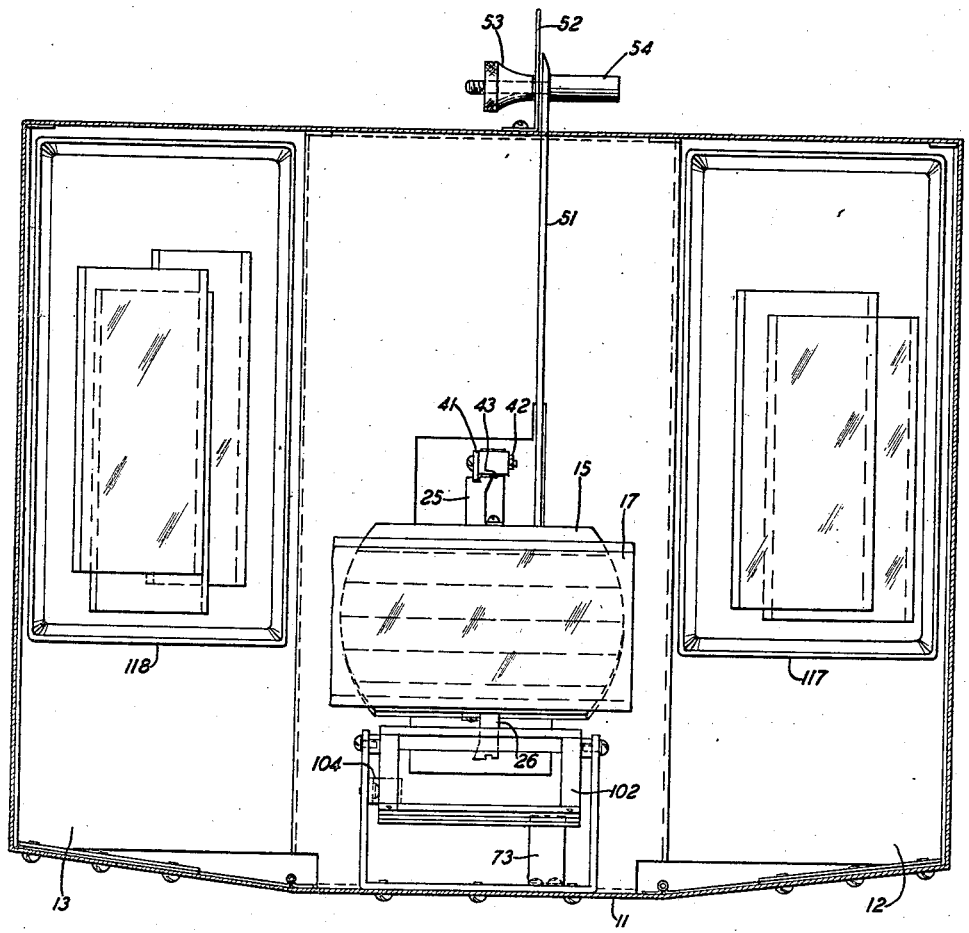
Fig. 3 is a view taken on lines 3—3 of Fig. 2.

Referring now to the drawings and first to Figs. 1, 2 and 3, there is illustrated an optical testing device embodying features contemplated by the present invention. The device illustrated comprises an outer housing or box which is substantially light-impervious and which may be looked upon as being made up of a central portion 11, respective right-hand and left-hand side extensions thereof 12 and 13, and upper extension 14. Specimen supporting platform 15 is adjustably mounted within central portion 11 of the outer casing; platform 15 is adapted to hold the specimen being examined and, as shown in Figs. 1 and 2, supports in the present instance quartz piezoelectric slab 17. Upon occasion, auxiliary table 16 (Fig. 15) may be mounted on platform 15; the arrangement and function of table 16 will be described subsequently.

Platform 15 is preferably made of some suitable black material, such as hard rubber, in order to prevent reflection or scattering of light thereby and is provided (Fig. 3) with parallel guide lines to facilitate proper alignment of the slab on the platform.

The height of platform 15, i. e., the spacing between the platform and trunnion supported plate 21 may be adjusted by rotating platform 15 either clockwise or counter-clockwise as desired, platform 15 being supported by screw-threaded spindle 22 the free end of which is positioned in a suitable cooperating bearing 23 which is supported, in turn, by plate 21. Flange 24, integral with spindle 22, serves to strengthen and reenforce the junction of the platform and spindle.

Arms 25 and 26 are carried by platform 15 being attached thereto at diametrically opposite points. The respective free end of each arm is notched; as platform 15 is rotated for adjustment of its height one or the other of the notches will engage the edge of pivoted arm 41 each time the platform is rotated one-half turn if arm 41 be in "engaging" position. Engagement of one of the notches and arm 41 will halt further rotation of platform 15 until arm 41 is rotated back on its pivot 42 (arm 41 is friction mounted at pivot 42 so that it will tend to remain in whatever position it is mounted) a sufficient distance to permit the notch of the respective arm 25 or 26 to clear the edge of arm 41. This arrangement provides simple and efficient means for holding platform 15 at the correctly adjusted height; in addition scale 43 is carried by arm 41 and may be conveniently read by using the adjacent arm, 25 or 26, as a pointer to show the adjusted height of the table. The proper height of platform 15 is such that the top surface of the specimen being examined will coincide with the zero position of scale 43. Thus, if scale 43 be calibrated in millimeters and the specimen be 5 millimeters in thickness the platform is set to coincide with the indication "5" on the scale.

In addition to adjustment of height, platform 15 and its entire supporting assembly is also capable of a tilting or rocking adjustment about an axis which passes through the vertical axis of the platform and which is a distance above the platform corresponding to the thickness of the specimen being examined. This adjustment is possible due to the mounting of trunnions 44 and 45 (attached to the respective free ends of plate 21) in respective, cooperating trunnion tracks 46 and 47 (Fig. 2). This rocking motion of the assembly whereby the desired angular adjustment, or tilt, of platform 15 with respect to the longer dimension of the base of the housing is attained, is controlled through arm 51, one end of which is attached to trunnion 45 and the other end of which extends through the rear wall of the outer casing. (Central portion thereof; Fig. 3.) Bracket 52 is mounted on the rear wall of the casing in a position wherein the extending end of arm 51 is closely adjacent to one face of the bracket. This face of the bracket is provided with a scale (Fig. 1) and the end of the arm is tapered and provided with an index mark to facilitate setting arm 51 (and platform 15 controlled thereby) at the desired angle (i. e., the actual angle of the crystal being tested) as indicated by the chart. As shown in Fig. 1 the arm has been set for an angle of 38 degrees for the examination of 38 degree specimens as mentioned above; the purpose of this angular adjustment will be described subsequently. When the desired angular setting has been attained, arm 51 is locked in position by tightening nut 53 on bolt 54 thereby drawing arm 51 into engagement with bracket 52 (Fig. 3). Bolt 54 is carried by arm 51 and is positioned in slot 55 provided in bracket 52 (Fig. 1).

Two separate light sources are mounted in upper extension 14 of the housing, lamp 71 being positioned above and slightly to the rear of platform 15 and lamp 72 being mounted also above but farther to the rear of the platform. Each of the lamps is provided with leads (shown broken) for connection of the respective lamp in circuit with a suitable power source (not shown) and with control switch 73 the action of which will be described subsequently.

Extension 14 is divided into two distinct portions, so far as illumination from lamps 71 and 72 is concerned, by partition 74 which extends across the entire width of the extension and from the top thereof substantially to the lower edge of the extension.

Plano-convex lens 75 is supported by bracket 76 in the path of the light rays projected by lamp 71 toward platform 15 while achromatic lens 77 is supported by apertured plate 81 in the path of the light rays projected by lamp 72 toward platform 15.

Light shields 82, 83 and 84 are provided with respective apertures 85, 86 and 87 which are properly positioned to confine light rays produced by lamp 72 to a beam that will just cover lens 77 and to prevent appreciable diffuse or reflected light from reaching the lens; the particular purpose of this will be described subsequently.

Although not illustrated, it will be understood that suitable ventilation means are provided in the housing and partitions and that such means should preferably be so located as to permit free flowing of air and yet prevent passage of light from the interior of the lamp compartments to the outside of the housing and to the test compartment and vice versa.

As pointed out above partition 74 divides upper extension 14 into two distinct portions so far as light from lamps 71 and 72 is concerned; partitions 88 and 74, apertured plate 81 and portions of the casing wall all cooperate to enclose lamp 72 in a compartment the only directly light pervious portion of which is lens 77 mounted in apertured plate 81.

Viewing screen 102 is pivotally mounted within central portion 11 of the casing being positioned slightly forward of platform 15. The screen proper, i. e., the translucent portion of the assembly, may comprise two closely mounted sheets of cellulose acetate of the order of 25 mils thickness each side of each sheet being sand blast finished. The screen is movable between two extreme positions, a forward position as shown by full lines in Fig. 1 and a rearward position as shown by dotted lines; movement of the screen is checked at these extreme positions by contact of arm 103 (movable with the screen) with either the lower or upper extension of bracket 104. Switch 73 which is shown only in general outline in order to simplify illustration, is so mounted that the projecting operating arm thereof is engaged by arm 103 during movement of the latter from upper position to lower position the operating arm being moved from one extreme position to the other due to such engagement so that the position of the switch arm at any particular moment is dependent upon the position of screen 102 at the time.

A chute-like viewer 105 is mounted on a front wall of the housing and communicates with the interior thereof; the viewer is so shaped and positioned that the line of vision of a user is directed to the object, such as slab 17, positioned on platform 15. Screen 102 when in forward position is out of this line of vision and, when in rearward position, is in the line of vision.

Openings 111 and 112 are provided in the front walls of right-hand and left-hand extensions 12 and 13, respectively, and provide access to the interiors thereof; each of these apertures is partially shielded by several layers of fabric as shown in Fig. 2.

As shown in Figs. 2 and 3, container 117 for holding slabs to be tested is placed in extension 12 and container 118 for holding tested slabs is placed in extension 13; these containers may be inserted and removed through openings 111 and 112.

It will be apparent from the preceding description particularly from examination of Figs. 1 and 2, that the various items of the assembly are readily accessible for cleaning and replacement. As shown in Fig. 2 the side walls of extension 14 are hinged and may be raised, upon removal of nuts 113 and/or 114, to expose the interior of the extension. Lens 75 may be readily slipped out of its holder for cleaning or replacement and lens 77 may also be easily removed for the same purposes. Lamps 71 and 72 may also be readily removed from their respective brackets without disturbing the positions of the brackets which are accurately adjusted for perfect alignment of the respective lamps, lenses and platform center. This adjustment of the brackets is facilitated by the utilization of thumbscrews for joining the respective brackets and the supporting arms (Fig. 1).

Considering now the method of using the testing device described above; let us assume that quartz slab or specimen 17 is a 38 degree slab, i. e., a slab which, as described above, has been cut from a Z-cut section at an angle of +38 degrees if untwinned, or at an angle of +38 degrees to the major twin of an electrically twinned section (it will thus be cut at −38 degrees from the minor twin). After cutting, the slab is etched by a suitable method, for example, by use of hydrodfluoric acid, after which it (slab 17) is, as shown in Fig. 1, placed on platform 15. As slab 17 is a 38 degree slab, arm 51 is adjusted to and locked in the 38 degree position as indicated by the scale on bracket 52. (This same setting would be used if −38 degree slabs were being inspected.)

We will assume first that it is desired to ascertain whether or not twinning is present in slab 17 and, if such twinning be present, to indicate the boundaries thereof. It is believed that the testing procedure may best be described by referring to the schematic showings of Figs. 4 and 6 keeping in mind, at the same time, that complete apparatus for carrying out such tests is shown in Figs. 1, 2 and 3.

As viewing screen 102 is not used in the first, or twinning, test it is moved to the forward position referred to above. When in this position; arm 103 carried by the viewing screen moves switch arm 115 (Fig. 4) of switch 73 to "down" position whereby an obvious energizing path for lamp 71 is completed. (It should be understood that lamps 71 and 72 may be energized by other sources than the batteries illustrated; the types of energizing paths and switching means shown have merely been selected as being conveniently illustrative.)

Figure 4:
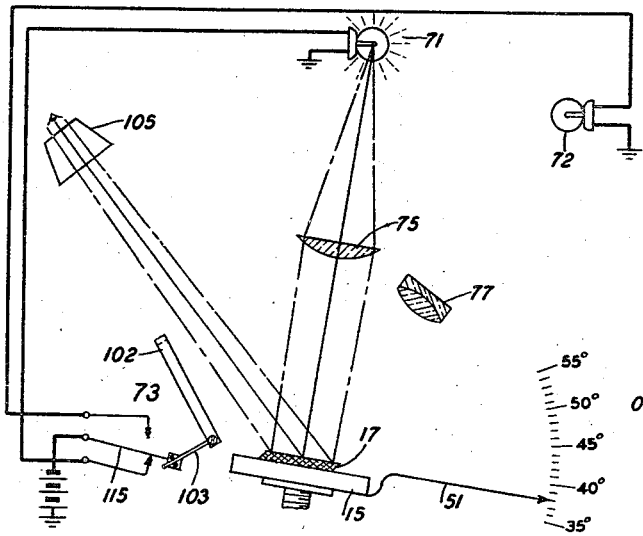
Fig. 4 is a schematic representation of the twinning test carried out as contemplated by the present invention.
Figure 5:
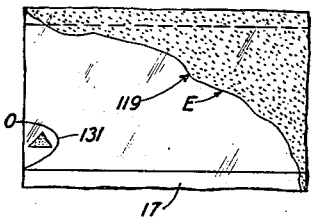
Fig. 5 is a top view of a quartz slab in which electrical twinning is present as indicated by the test procedure illustrated by Fig. 4.

With viewing screen 102 in the forward position as shown in Fig. 4, therefore, lamp 71 will be lighted while lamp 72 will be dark. Light rays from lamp 71 pass through plano-convex lens 75 and are so distributed thereby that the surface of slab 17 which is being viewed through viewer 105 is evenly illuminated. Assuming that electrical twinning be present in slab 17, the slab as viewed through viewer 105 will present the appearance of Fig. 5, i. e., a portion of the slab will appear dark and the other portion will shine with considerable brilliance; the observer may then mark the boundary between the two areas with a lead pencil or other suitable means; boundary line 119(E) is shown marked on slab 17 of Fig. 5. It may transpire that there will be several different areas of electrical twinning indicated in a slab and in such event, of course, the boundary of each area is marked. Further, regions of optical twinning will also show up and such regions will be surrounded with an outer pencilled boundary 131 (O). (These regions are at once marked useless.)

Figure 6:
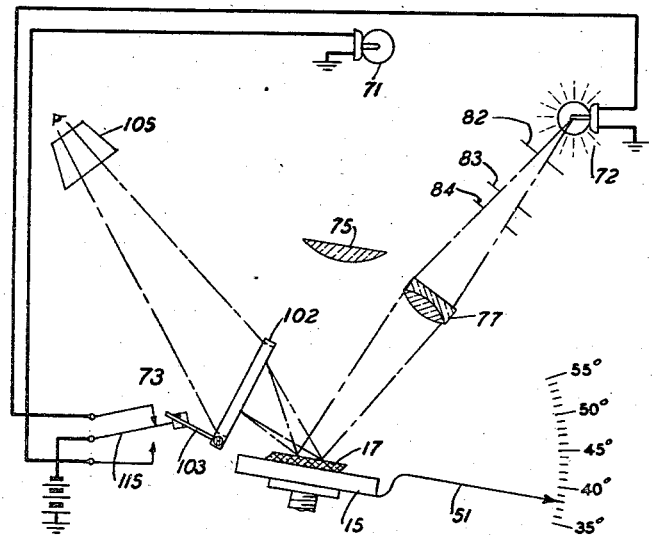
Fig. 6 is a schematic representation of the orientation test carried out as contemplated by the present invention.

Having ascertained now that areas of electrical twinning are present in slab 17, it is next desirable that the sense of orientation, i. e., "good" (+38 degrees) cut or "bad" (−38 degrees) cut be determined. As viewing screen 102 is to be used in this "orientation" test, it is moved to the rearward position (Fig. 6). Movement of screen 102 to this position and the accompanying movement of arm 103 causes movement of operating arm 115 of switch 73 to the "up" position whereby an obvious energizing path for lamp 72 is completed.

With viewing screen 102 in the rearward position, i. e., the position wherein it is in the line of vision between viewer 105 and slab 17, lamp 72 will be lighted and lamp 71 will be extinguished. Light rays from lamp 72 are projected upon slab 17 in a concentrated beam due to the action of lens 77 so that only a "spot" is illuminated; slab 17 may be moved about on platform 15 by the operator so that the desired area may be illuminated. The light rays projected by lens 77 onto slab 17 are reflected therefrom onto screen 102.

It was mentioned above that appreciable diffuse or reflected light is prevented from reaching lens 77 by apertured light shields 82, 83 and 84; this prevents extraneous illumination of viewing screen 102.

When screen 102 is in rearward position direct viewing of slab 17 through viewer 105 is prevented but an image of the slab may be seen in mirror 132 by looking over the top of the screen.

Now as the operator views screen 102 through viewer 105 he will see a distinctive "figure" on the screen, the nature of which will indicate to him the sense of orientation of that particular area of the slab that has been spotted with the light rays. For example, if the particular area illuminated is "good" i. e., +38 degrees, the observer will see a "figure" similar to that of either Fig. 7 or Fig. 8. (The four outside straight lines forming a square represent the borders of screen 102 while the two crossed straight lines represent two reference lines provided on the face of screen 102.) Whether the figure of Fig. 7 or that of Fig. 8 is seen depends upon the handedness of slab 17 (the figure of Fig. 7 being that of left-hand quartz while the figure of Fig. 8 is that of right-hand quartz); this fact is ordinarily not of interest in the actual production work of crystals.

Now in the instance above, had the area been "bad", i. e. −38 degrees, the figure seen would then have been similar to either that of Fig. 9 or Fig. 10, depending again upon the handedness. (The figure of Fig. 9 is that of left-hand quartz while the figure of Fig. 10 is that of right-hand quartz.)

It will be obvious that the "good figures" and the "bad figures" are sufficiently different as to be readily distinguishable one from the other. While interpretation of the "figures" indicates not only the sense of orientation but also the handedness and the sense of the electric axis in the slab it is usually only the sense of orientation that is of interest at the particular stage of production of crystals at which it is contemplated that the arrangement described would be most often used.

Several or all of the opposite electrically twinned areas may be tested if desired although it is necessary to test only one area as it will be known that any adjacent electrical twin area will be of opposite sense.

After testing the slab, any portions found to be "bad" (−38 degrees) may be cut away after which the slab may be diced up into piezoelectric plates ready for edge grinding. It will be understood, of course, that for slabs of other than 38 degrees cut, arm 51 will be adjusted to the pertinent angle as indicated by the scale provided on bracket 52 and the above procedure repeated. Figures similar to those of Fig. 7 or 8 will always indicate positive cuts while figures similar to those of Fig. 9 or 10 will always indicate negative cut regions. Thus if the desired good specimen is to be a −49 degree plate, Figs. 9 and 10 indicate "good" portions and Figs. 7 and 8 indicate "bad" portions, i. e., the reverse of the example cited above.

When using the particular embodiment of the invention illustrated, it is contemplated that the operator will sit facing the front center portion of the device with his face close to or touching the upper open end of viewer 105. A supply of slabs to be tested will be placed in container 117 positioned in right-hand extension 12 of the housing while container 118 for receiving tested and marked slabs is placed in left-hand extension 13. The operator may then insert his right hand into extension 12 through aperture 111 and his left hand into extension 13 through aperture 112 whereupon he may use his right hand for placing the slabs on platform 15 for adjusting their position thereon, and for marking the twinning boundaries on the slab and may use his left hand for manipulation of screen 102 and for removing the tested and marked slabs from platform 15 and for depositing them in the container provided in extension 13. The layers of fabric, which are provided as closures of the apertures, serve to prevent the entry of light.

The angular arrangements of illumination and viewing followed in the instruments described above are based upon certain established, controlling facts which will now be briefly described with reference to Figs. 11 and 12. In these figures the direction of the optic axis is indicated and the direction of the pertinent electric axis is assumed to be perpendicular to the plane of the paper.

In the instance of plates the major faces of which are cut parallel to an electric axis of the quartz crystal and at an angle from the optic axis of the order of from 35 degrees to 55 degrees, this angle being in the negative sense, i. e., towards parallelism with a major cap face of the crystal, the etch pits that develop when a ground surface of the plate is etched will exhibit a large proportion of surfaces in alignment with a plane which is parallel to the electric axis and at an angle from the optic axis of 58 degrees taken in the negative sense, i. e., towards parallelism with a major cap face of the crystal. However, plates, the major faces of which are cut parallel to an electric axis of the quartz crystal and at an angle from the optic axis of the order of from 35 degrees to 55 degrees but with the angle in this case being in the positive sense, i. e., towards parallelism with a minor cap face of the crystal, will not develop, when a ground surface is etched, etch pits exhibiting surfaces parallel to the negative 58 degree plane referred to above.

It follows, therefore, that, when an electrically twinned plate of any of the above orientations is illuminated and viewed by reflected light at such angles as to utilize the reflection obtained from a 58 degree plane therein, the portion of the plate which is actually a negative orientation will give strong reflection (in view of the nature of the surfaces exhibited by the etch pits) while that portion of the plate which is actually a positive orientation will give no reflection.

Fig. 11 is a diagrammatic representation of the angular arrangements of illumination and viewing which are followed in utilizing the apparatus of Fig. 1 for carrying out the test of Fig. 4. The 38 degree slab 17 is shown in position on platform 15 and it will be observed that the normal to a 58 degree plane bisects the angle between light source 71 and the eye of the tester.

Fig. 12 is a diagrammatic representation of the angular arrangements of illumination and viewing which are followed in utilizing the apparatus of Fig. 1 for carrying out the test of Fig. 6. It will be observed in this case that the reflected image of the filament of light source 72 falls on viewing screen 102 at point C and that the normal to the —58 degree plane bisects the angle between point C and the filament of light source 72. Point C on viewing screen 102 corresponds to the intersection of the horizontal and vertical rulings which are provided on the screen as shown in Figs. 7 to 10. It will be observed that only in the instance of the figures of Figs. 9 and 10 does light fall at this intersection point (corresponding to point C).

In addition to the especially important —58 degree reflection plane, other reflection planes and contours are developed by etching the ground surface of the slab which, in a nearby angular range, are distinctly different for positive and negative cut surfaces. Thus on a negative cut surface there is obtained in addition to the strong reflection from a —58 degree plane at point C, Fig. 10 (which reflection forms the lower, enlarged portion of the figures of Figs. 9 and 10) reflections from other planes parallel to the electric axis of the crystal but at lesser angles to the optic axis; these additional reflections form the vertical shaft portions of the figures. However, on a positive cut surface the etch pits exhibit entirely different facets which upon reflecting the light to the viewing screen cause entirely different figures from those of Figs. 9 and 10. It will be observed that in this instance (see Figs. 7 and 8) no part of the figure lies on the vertical reference line of the screen.

To recapitulate, therefore, the basic optical theory utilizes light reflections from etch pits in the quartz slab which exhibit reflection surfaces which are parallel to an electric axis of the quartz and at an angle of approximately 58 degrees from the optic axis thereof and are of such sense as to be towards parallelism with a possible major cap of the mother crystal (i. e., —58 degrees) and also utilizes the light reflections from etch pits which exhibit reflecting planes at nearby angles to planes parallel to an electric axis of the quartz and at angles of either —58 degrees or +58 degrees from the optic axis. Since electrical sense and handedness both affect the sense of orientation of plates cut parallel to an electric axis and at an angle to the optic axis, both electrical twinning and optical twinning may be detected.

Since quartz possesses three electrical axes, a sphere or other rounded piece of quartz, when etched, will develop etch pits in two diametrically opposite sets of three regions each, each region being equally angularly spaced about the optic axis of the piece, and each region exhibiting etch pits whereupon the —58 degree reflection plane may be utilized as above to determine orientation.

Figure 14:
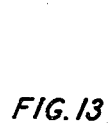
Fig. 14 is a plan view of the crystal of Fig. 13.
Figure 13:
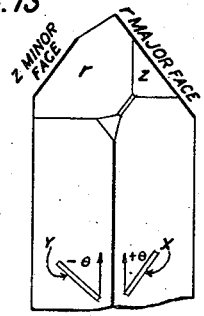
Fig. 13 is a side elevational view of a natural quartz crystal.

In order to facilitate consideration of the description immediately above, there is illustrated in Figs. 13 and 14 the general outlines of a natural quartz piezoelectric crystal complete with cap faces. Those cap faces designated $z$ are minor cap faces while those designated $r$ are major cap faces. Plate X is inclined about an X-axis of the crystal towards parallelism with a minor cap face while plate Y is inclined about the X-axis towards parallelism with a major cap face of the crystal.

Referring now to Figs. 15, 16 and 17, an auxiliary specimen supporting table 16 is illustrated;

in the event it is desired to utilize the testing device for observation of small plates, such as plate 133 shown in position on the table, instead of the larger slabs, the auxiliary table 16 may be mounted on platform 15, hollow shaft 134 of table 16 then being positioned in opening 135 (Fig. 1).

Auxiliary table 16, like platform 15, is preferably of suitable black material such as hard rubber, and, is provided with a shoulder against which a plate being tested may be aligned. When auxiliary table 16 is being mounted on platform 15 it may be aligned with the reference crosslines provided on the platform surface. Even though the plate being tested has the lead-in and supporting wires attached thereto, it may still be readily mounted on table 16 as one of the wires may be positioned in hollow shaft 134 (see Fig. 17). Evaporated and other types of metallic platings on the etched plate usually enhance the reflecting power of the etch pits.

While certain specific embodiments of the invention have been selected for illustration and detailed description, the invention is not, of course, limited in its application to such embodiments. The embodiments disclosed should be looked upon as illustrative of the invention and not as restrictive thereof.

What is claimed is:

1. Apparatus for performing a plurality of optical tests on a specimen of crystalline material, comprising a housing having a base and a plurality of outer enclosing walls, a specimen supporting platform mounted within said housing relatively close to the base thereof, means for adjusting said platform with respect to its spacing from said base, means for adjusting said platform with respect to the angular relationship thereof to said base, a first means for illuminating a specimen supported on said platform, a second means for illuminating a specimen supported on said platform, said first means including a light source and a lens for evenly distributing and spreading the light rays from the source whereby said first means is effective to illuminate one entire surface of a specimen with substantially equal intensity, said second means including a second light source and means for confining the light rays from the second source to a restricted beam whereby said second illuminating means is effective to illuminate only a relatively small area of one surface of a specimen, and means for selectively controlling the energization of said illuminating means one at a time, said housing having an aperture in an outer wall so located with respect to the position of said platform that a specimen on said platform may be viewed through the aperture from the exterior of said housing, the positional relationship of parts of the apparatus being such that said light sources and the viewing aperture are in a vertical plane at right angles to the axis of angular adjustment of said platform.

2. Apparatus for performing a plurality of optical tests on a specimen of crystalline material, comprising a housing having a base and a plurality of outer enclosing walls, a specimen supporting platform mounted within said housing relatively close to the base thereof, means for adjusting said platform with respect to its spacing from said base, means for adjusting said platform with respect to the angular relationship thereof to said base, a first means for illuminating a specimen supported on said platform, a second means for illuminating a specimen supported on said platform, said first means including a light source and means for evenly distributing and spreading the light rays from said source whereby said first means is effective to illuminate a large portion of one surface of a specimen with substantially equal intensity, said second means including a second light source and means for confining the light rays from the second source to a restricted beam whereby said second illuminating means is effective to illuminate only a relatively small area of one surface of a specimen, means for selectively controlling the energization of said illuminating means one at a time, said housing having an aperture in an outer wall thereof so located with respect to the position of said platform that a specimen on said platform may be viewed through the aperture from the exterior of said housing and a viewing hood mounted over the aperture and adapted to direct the line of vision of an observer through the aperture to a specimen mounted on said platform, the positional relationship of parts of the apparatus being such that said light sources and the viewing aperture are in a vertical plane at right angles to the axis of angular adjustment of said platform.

3. Apparatus for performing a plurality of optical tests on a specimen of crystalline material, comprising a housing having a base and a plurality of outer enclosing walls, a specimen supporting platform mounted within said housing relatively close to the base thereof, means for adjusting said platform with respect to its spacing from said base, means for adjusting said platform with respect to the angular relationship thereof to said base, a first means for illuminating a specimen supported on said platform, a second means for illuminating a specimen supported on said platform, said first means including a light source and means for evenly distributing and spreading the light rays from the source whereby said first means is effective to illuminate one entire surface of a specimen with substantially equal intensity, said second means including a second light source and means for confining the light rays from the second source to a restricted beam whereby said second means is effective to illuminate only a relatively small area of one surface of a specimen, said housing having a viewing aperture therein so located with respect to the position of the platform that a specimen mounted on said platform may be observed through the aperture from the exterior of said housing, a viewing screen pivotally mounted in said housing, said screen being movable from one extreme position, wherein it intercepts the line of vision between the aperture and said platform, to a second extreme position wherein it is outside of said line of vision, means for energizing each of said illuminating means, and means for selectively controlling the actuation of said energizing means in accordance with the position of said screen.

4. Apparatus for performing a plurality of optical tests on a specimen of crystalline material, comprising a housing having a base and a plurality of outer enclosing walls, a specimen supporting platform mounted within said housing relatively close to the base thereof, means for adjusting said platform with respect to its spacing from said base, means for adjusting said platform with respect to the angular relationship thereof to said base, a first means for illuminating a specimen supported on said platform, a second means for illuminating a specimen supported on said platform, said first means including a light source and a lens for evenly distributing and spreading the light rays from the source whereby said first means is effective to illuminate one entire surface of a specimen with substantially equal intensity, said second means including a second light source and means for confining the light rays from the second source to a restricted beam whereby said second illuminating means is effective to illuminate only a relatively small area of a surface of a specimen, said housing having a viewing aperture therein so located with respect to the position of the platform that a specimen mounted on said platform may be observed through the aperture from the exterior of said housing, a viewing screen pivotally mounted in said housing, said screen being movable from one extreme position wherein it intercepts the line of vision between the aperture and said platform to a second extreme position wherein it is outside of said line of vision, an energizing circuit for each of said illuminating means, a two-position switch for selective control of said energizing circuits, means carried by said viewing screen and effective during movement thereof from one extreme position to the other to operate said switch from one position to the other whereby said illuminating means are selectively energized in accordance with the position of said viewing screen.

5. In an optical device for performing a plurality of different tests on specimens of crystalline material, the first of said tests including as definite steps illuminating a relatively small area of the material under test and viewing the illuminated area through a viewing screen and the second of said tests including as definite steps illuminating a relatively large area of the material under test and viewing the illuminated area directly, a specimen supporting platform, a first source of light, means for directing light from said first source to said platform in the form of a concentrated beam of light rays, a second source of light, means for directing light from said second source to said platform in the form of a plurality of diverged light rays, an eyepiece for viewing a specimen on said platform, a viewing screen pivotally mounted for movement from one definite position to a second definite position, said screen when in one of said positions being out of the line of vision between said eyepiece and said platform and being, in the other of said positions, in said line of vision, and means for selectively controlling the energization of said light sources in accordance with the position of said viewing screen.

6. Apparatus for performing a plurality of optical tests on a quartz specimen the first of which tests includes as definite steps illuminating a substantially large area of the specimen and viewing the illuminated area and the second of which tests includes as definite steps illuminating a relatively small area of the specimen and viewing the illuminated area, comprising a substantially light-impervious housing, an angularly adjustable specimen supporting platform mounted within said housing, said housing having a viewing aperture therein through which a specimen supported on said platform may be viewed, a first optical system and a second optical system in said housing, said first optical system comprising a light source and a lens for directing light rays therefrom to said platform in the form of a divergent bundle whereby a substantially large surface is illuminated thereby, said second optical system comprising a light source and a lens for directing rays therefrom to said platform in the form of a converging bundle whereby a relatively small area is illuminated thereby, energizing means for each of said light sources, and means for selectively controlling the energization of said light sources, the positional relationship of parts of the apparatus being such that said light sources and the viewing aperture are in a vertical plane at right angles to the axis of angular adjustment of said platform.

7. Apparatus for performing a plurality of different tests on a specimen of crystalline material the first of which tests includes as definite steps illuminating a substantially large area of the specimen and viewing the illuminated area and the second of which tests includes as definite steps illuminating a relatively small area of the specimen and viewing the illuminated area, comprising a substantially light-impervious housing, said housing having a viewing aperture therein, a specimen supporting platform mounted in said housing relatively close to the base thereof, means for adjusting the spacing of said platform with respect to the base of said housing, means for adjusting the angular tilt of said platform with respect to said base, a first light source mounted in said housing above said platform, a second light source also mounted in said housing above said platform, means for directing light from said first light source to said platform in the form of a plurality of diverged light rays, means for directing light from said second light source to said platform in the form of a concentrated beam of light rays, said respective light sources being adapted for use in connection with said first of the tests and said second of the tests respectively, a viewing screen movably mounted in said housing, said screen being adapted to be used in connection with one of the tests and being movable for such purpose to a position wherein it is in the line of vision from the viewing aperture in said housing to said platform, said screen being also movable to a second position wherein it is outside of said line of vision, and means controlled by movement of said screen from one of said positions to the other for selectively controlling the energization of said light sources.

8. Optical testing apparatus for performing a plurality of different tests on a specimen of quartz the first of which tests includes as definite steps illuminating a substantially large area of the quartz specimen and viewing the illuminated area and the second of which tests includes as definite steps illuminating a relatively small area of the specimen and viewing the illuminated area, comprising a substantially light-impervious housing, a specimen supporting table mounted inside said housing, a first optical system in said housing adapted for use in the first test, a second optical system in said housing adapted for use in the second test, said first optical system comprising a light source and a lens for directing light from said light source to said table in the form of a plurality of diverged light rays, said second optical system comprising a second light source and a lens for directing light from said second light source to said table in the form of a concentrated beam of light rays, a light-impervious shield mounted in said housing between the respective light sources of said optical systems, said housing having a viewing aperture therein through which said table may be viewed from the exterior of said housing, a viewing screen mounted in said housing, said viewing screen being adapted for use in connection with one of said tests and being movable for such purpose to a position in the line of vision between the aperture in said housing and said table, said viewing screen being movable to a second position outside of said line of vision, an energizing circuit for each of said light sources, and means for selectively controlling the completion of the energizing circuits in accordance with the position of said viewing screen.

9. An optical device for testing quartz slabs comprising a substantially light-impervious housing, the rear wall of the housing having an elongated slot therein, a pair of spaced trunnion tracks mounted within said housing relatively close to the base thereof, a trunnion movably supported by each of said tracks, a plate supported by said trunnions, a slab supporting platform supported by said plate, means for adjusting the vertical position of said platform with respect to said plate, means for yieldably holding said platform in selected positions of vertical adjustment, an arm, one end of said arm being attached to one of said trunnions and the other end extending through the slot in the rear wall of the housing whereby movement of the platform assembly supported by said trunnions may be controlled from the exterior of said housing by the extending portion of the arm, and means within said housing for illuminating a slab supported by said platform, the front wall of said housing having a viewing aperture therein through which a slab supported on said platform may be observed.

10. An optical device for performing a plurality of different tests on quartz slabs the first of which tests includes as definite steps illuminating a substantially large area of the slab being tested and viewing the illuminated area and the second of which tests includes as definite steps illuminating a relatively small area of the slab being tested and viewing the illuminated area, comprising a substantially light-impervious housing, the rear wall of the housing having an elongated slot therein, a pair of spaced trunnion tracks mounted within said housing relatively close to the base thereof, a trunnion movably supported by each of said tracks, a plate supported by said trunnions, a slab supporting platform supported by said plate, means for adjusting the vertical position of said platform with respect to said plate, means for yieldably holding said platform in selected positions of vertical adjustment, an arm, one end of said arm being attached to one of said trunnions and the other end extending through the slot in the rear wall of the housing whereby movement of the platform assembly supported by said trunnions may be controlled from the exterior of said housing by the extending portion of the arm, a bracket mounted on the rear wall of the housing adjacent to the slot therein, said bracket having an elongated slot therein, means cooperating with the extending end of said arm and said bracket and movable in the slot provided in said bracket for locking said arm in selected positions of adjustment, a scale on said bracket for indicating adjusted positions of said arm, a plurality of optical systems within said housing for illuminating a slab supported by said platform, the first of said optical systems comprising a first light source and a lens for directing light from said source to said platform in the form of a plurality of diverged light rays and the second of said optical systems comprising a second light source and a lens for directing light from said second source to said platform in the form of a concentrated beam of light rays, the front wall of said housing having a viewing aperture therein through which a slab supported by said platform may be viewed, a viewing screen movable between two extreme positions, said viewing screen being adapted for use in connection with one of said tests when in the first of said extreme positions and being in the line of vision between the viewing aperture and the platform in said first extreme position and outside of the line of vision in the other extreme position, and means controlled by movement of said viewing screen between said two extreme positions for selectively controlling activation of said light sources one at a time.

11. In an optical device for performing a plurality of different tests on specimens of crystalline material a first of which tests includes as definite steps illuminating a substantially large area of the specimen and viewing the illuminated area directly and a second of which tests includes as definite steps illuminating a relatively small area of the specimen and viewing the illuminated area through a viewing screen, a platform for supporting a specimen in the form of a relatively large slab, an auxiliary table for supporting a specimen in the form of a relatively small plate removably mounted on said platform, a first light system and a second light system, said first light system being used in the first of said tests and comprising a first light source and means for directing light from said first source to said table when in position on said platform in the form of a plurality of diverged light rays, said second light system being used in the second of said tests and comprising a second light source and means for directing light from said second source to said table when in position on said platform in the form of a concentrated beam of light rays, an eyepiece for viewing a specimen on said table, a viewing screen pivotally mounted for movement from one definite position to a second definite position, said screen when in one of said positions being out of the line of vision between said eyepiece and said table and being, in the other of said positions, in said line of vision, and means for selectively controlling the energization of said light sources in accordance with the position of said viewing screen.

12. In an optical device for performing a plurality of different tests on specimens of crystalline material a first of which tests includes as definite steps illuminating a relatively small area of the specimen and viewing the illuminated area through a viewing screen and a second of which tests includes as definite steps illuminating a substantially large area of the specimen and viewing the illuminated area directly, a specimen supporting platform, a first optical system and a second optical system, said first optical system comprising a first light source and means for directing light from said first light source to said platform in the form of a concentrated beam of light rays and said second optical system comprising a second light source and means for directing light from said second light source to said platform in the form of a plurality of diverged light rays, an eyepiece for viewing a specimen on said platform, a viewing screen pivotally mounted for movement from one definite position to a second definite position, said viewing screen when in one of said positions being interposed in the line of vision between said eyepiece and said platform, a mirror so positioned that an image of a specimen mounted on said platform may be seen from said eyepiece when said screen is in the interposed position, and means for selectively controlling the energization of said light sources in accordance with the position of said viewing screen.

13. The method of testing a piezoelectric plate cut from a quartz crystal for the presence of twinning, the major faces of which plate are cut parallel to an electric axis of the crystal and at an angle from the optic axis of the crystal of the order of from 35 degrees to 55 degrees, which includes the steps of etching a major face of the plate, transmitting light to said etched face, and observing the illuminated face to determine whether light is reflected uniformly from all portions of said face, the light being reflected from a selected plane, said selected plane being parallel to said electric axis of the crystal and at an angle of 58 degrees from the optic axis towards parallelism with a major cap face of the crystal.

14. The method of testing a piezoelectric plate cut from a quartz crystal for the presence of twinning, the major faces of which plate are cut parallel to an electric axis of the crystal and at an angle from the optic axis of the crystal of the order of from 35 degrees to 55 degrees, which includes the steps of etching a major surface of the plate, transmitting light to said etched surface for illumination thereof, and viewing the illuminated surface to observe whether the transmitted light is reflected uniformly from all illuminated portions of the surface, the respective angles of illumination and of viewing with respect to said illuminated surface being such that the angle between the effective center line of the transmitted light rays and the effective center line of the viewing line of vision is bisected by the normal to a plane through the plate which is parallel to said electric axis of the crystal and at an angle of 58 degrees from the optic axis toward parallelism with a major cap face of the mother crystal.

15. The method of testing a piezoelectric plate for the presence of twinning, said plate being cut from a quartz crystal with the major surfaces parallel to an electric axis of the crystal and at an angle from the optic axis of the crystal of the order of from 35 degrees to 55 degrees, which includes the steps of etching the plate, transmitting light to a major surface of the plate for illuminating said surface, said light being transmitted at an angle with respect to a plane in the plate which is parallel to said electric axis of the crystal and at an angle of 58 degrees from the optic axis towards parallelism with a major cap face of the crystal, and observing whether said transmitted light is reflected uniformly from all illuminated portions of the surface.

16. Apparatus for testing a quartz slab the surfaces of which have been etched comprising angularly adjustable means for supporting a slab to be tested, a first light source and a second light source, means for illuminating substantially one entire surface of the slab with light from said first light source, means for illuminating a small area of the same surface of the slab with light from said second source, a viewing screen, means for illuminating an area of said screen by reflection from said illuminated small area of the slab, a single viewing means for observing either the illuminated area of said viewing screen or said illuminated surface of the slab, and means for selectively controlling the activation of the light sources one at a time, the positional relationship of parts of the apparatus being such that said light sources and the viewing means are in a vertical plane at right angles to the axis of angular adjustment of said supporting means.

GERALD W. WILLARD.